United States Patent
Cardonha et al.

(10) Patent No.: US 10,212,270 B2
(45) Date of Patent: Feb. 19, 2019

(54) INFERRING SOCIAL PROTOCOLS GUIDING THE USE OF PORTABLE DEVICES

(71) Applicant: International Business Machines Corporation, Armonk, NY (US)

(72) Inventors: Carlos Henrique Cardonha, São Paulo (BR); Marco Aurelio Stelmar Netto, São Paulo (BR); Vagner Figueredo de Santana, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/590,423

(22) Filed: May 9, 2017

(65) Prior Publication Data

US 2017/0244830 A1    Aug. 24, 2017

Related U.S. Application Data

(62) Division of application No. 14/873,712, filed on Oct. 2, 2015, now Pat. No. 9,749,459.

(51) Int. Cl.
| | |
|---|---|
| *H04M 3/00* | (2006.01) |
| *H04M 1/725* | (2006.01) |
| *H04W 24/02* | (2009.01) |
| *H04W 68/00* | (2009.01) |
| *H04W 4/04* | (2009.01) |
| *H04W 4/08* | (2009.01) |

(Continued)

(52) U.S. Cl.
CPC ........ *H04M 1/72577* (2013.01); *G06Q 10/10* (2013.01); *H04L 67/22* (2013.01); *H04M 1/72572* (2013.01); *H04W 4/043* (2013.01); *H04W 4/08* (2013.01); *H04W 24/02* (2013.01); *H04W 68/005* (2013.01); *H04L 67/26* (2013.01); *H04L 67/303* (2013.01); *H04M 1/72569* (2013.01); *H04W 4/21* (2018.02)

(58) Field of Classification Search
CPC ....... H04W 8/245; H04W 4/12; H04W 76/05; H04W 68/005; H04W 4/043; H04W 24/02; H04W 4/08; H04M 1/72519; H04M 1/72533; H04M 1/72577; H04M 1/72572; A63F 13/12; H04L 67/306
USPC ............ 455/418, 550.1, 412.2, 420; 463/29; 709/228

See application file for complete search history.

(56) References Cited

U.S. PATENT DOCUMENTS

| | | |
|---|---|---|
| 7,929,960 B2 | 4/2011 | Martin et al. |
| 8,020,104 B2 | 9/2011 | Robarts et al. |

(Continued)

FOREIGN PATENT DOCUMENTS

| | | |
|---|---|---|
| WO | 2007103886 A2 | 9/2007 |
| WO | 2013096950 A1 | 6/2013 |

OTHER PUBLICATIONS

List of IBM Patents or Patent Applications Treated as Related.

*Primary Examiner* — Danh C Le
(74) *Attorney, Agent, or Firm* — David M. Quinn; Ryan, Mason & Lewis, LLP

(57) ABSTRACT

A notification including one or more policies of use of one or more devices in an environment is received. The one or more policies are generated based on a pattern of use detected based on interaction data obtained by one or more sensors in the environment. Operation of one or more functionalities in the one or more devices is adjusted based on the one or more policies.

18 Claims, 6 Drawing Sheets

(51) Int. Cl.
*H04L 29/08* (2006.01)
*G06Q 10/10* (2012.01)
*H04W 4/21* (2018.01)

(56) References Cited

U.S. PATENT DOCUMENTS

| | | | |
|---|---|---|---|
| 8,611,272 B1 | 12/2013 | Hertzfeld et al. | |
| 8,626,111 B2 | 1/2014 | Waddell | |
| 8,634,813 B2* | 1/2014 | Paschetto | G08B 21/0283 |
| | | | 455/404.2 |
| 8,676,182 B2 | 3/2014 | Bell et al. | |
| 8,935,633 B2 | 1/2015 | Bush et al. | |
| 8,954,226 B1* | 2/2015 | Binion | G06Q 40/08 |
| | | | 701/33.4 |
| 8,983,422 B2* | 3/2015 | Park | H04W 4/22 |
| | | | 455/404.1 |
| 9,270,679 B2 | 2/2016 | Davis et al. | |
| 9,613,523 B2* | 4/2017 | Davidson | G08B 29/04 |
| 2006/0063563 A1 | 3/2006 | Kaufman | |
| 2006/0160562 A1 | 7/2006 | Davis et al. | |
| 2009/0164400 A1 | 6/2009 | Amer-Yahia et al. | |
| 2010/0325686 A1 | 12/2010 | Davis et al. | |
| 2011/0153740 A1* | 6/2011 | Smith | H04L 67/20 |
| | | | 709/204 |
| 2011/0212770 A1* | 9/2011 | Ocko | A63F 13/12 |
| | | | 463/29 |
| 2012/0265867 A1* | 10/2012 | Boucher | H04M 3/5116 |
| | | | 709/223 |
| 2013/0031600 A1* | 1/2013 | Luna | G06F 21/554 |
| | | | 726/1 |
| 2013/0295913 A1 | 11/2013 | Matthews, III et al. | |
| 2014/0113674 A1 | 4/2014 | Joseph et al. | |
| 2014/0120961 A1* | 5/2014 | Buck | H04W 4/12 |
| | | | 455/466 |
| 2014/0136242 A1* | 5/2014 | Weekes | G06Q 40/08 |
| | | | 705/4 |
| 2015/0032481 A1 | 1/2015 | Norling-Christensen et al. | |
| 2015/0063202 A1* | 3/2015 | Mazzarella | H04B 7/18504 |
| | | | 370/316 |
| 2015/0204561 A1* | 7/2015 | Sadwick | F24F 11/006 |
| | | | 236/1 C |
| 2015/0215832 A1* | 7/2015 | Fitzpatrick | H04W 48/18 |
| | | | 455/426.1 |
| 2016/0191654 A1* | 6/2016 | Healey | H04L 67/306 |
| | | | 709/228 |

* cited by examiner

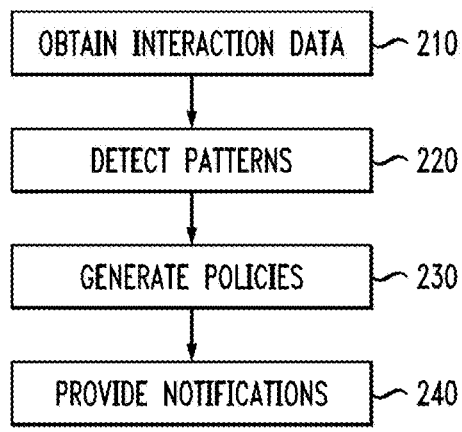
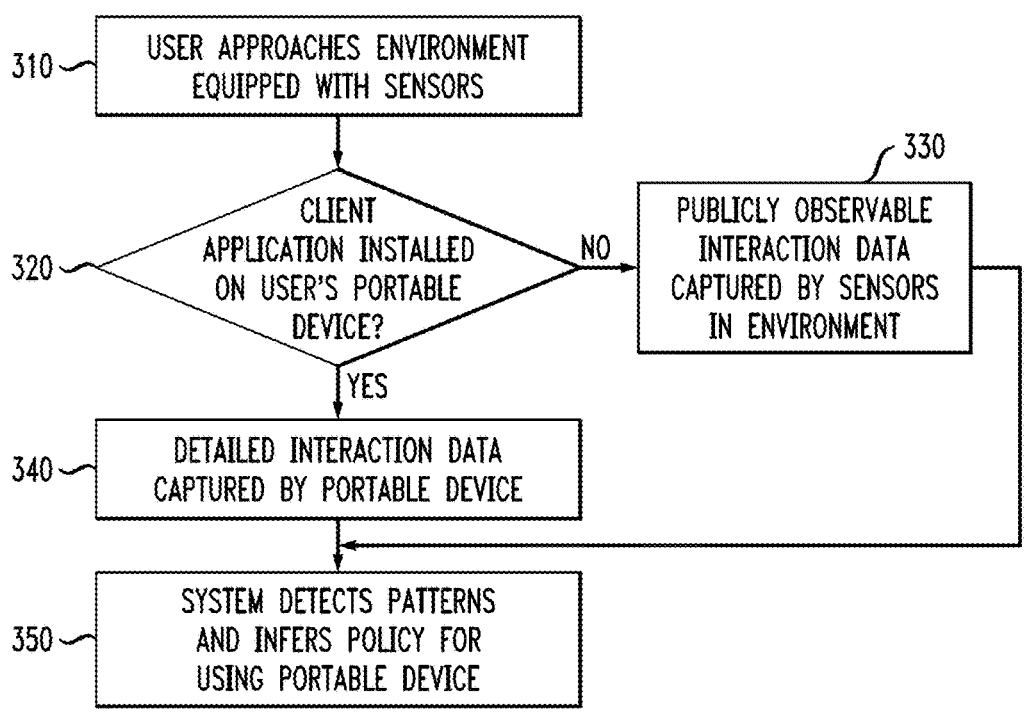

400

INFERRING SOCIAL PROTOCOLS GUIDING THE USE OF PORTABLE DEVICES

BACKGROUND

Social protocols are a set of rules or policies for human interactions which lead to a well-coordinated collaboration among the members of a group in a particular environment. Social protocols may guide a person to behave in a certain manner so as to not be disruptive in an environment. Social protocols may also guide a person's use of portable devices in an environment. In such environment, other members of the environment may have expressly or impliedly agreed on a set of rules for using portable devices. New members entering such environment without knowledge of existing social protocols may be disruptive to others.

SUMMARY

Embodiments provide techniques for inferring one or more social protocols guiding use of portable devices.

For example, in one embodiment, a method for inferring one or more social protocols guiding use of portable devices comprises receiving a notification comprising one or more policies of use of one or more devices in an environment, the one or more polices being generated based on a pattern detected based on interaction data obtained by one or more sensors in the environment. Operation of one or more functionalities in the one or more devices is adjusted based on the one or more policies.

In another embodiment, an article of manufacture to infer one or more social protocols guiding use of portable devices is provided. The article comprises a computer readable storage medium for storing computer readable program code which, when executed, causes a computer to: receive a notification comprising one or more policies of use of one or more devices in an environment, the one or more policies being generated based on a pattern of used detected based on interaction data obtained by one or more sensors in the environment; and adjust operation of one or more functionalities in the one or more devices based on the one or more policies.

In yet another embodiment, an apparatus to infer one or more social protocols guiding use of portable devices is provided. The apparatus comprises a memory and a processor operatively coupled to the memory and configured to: receive a notification comprising one or more policies of use of one or more devices in an environment, the one or more policies being generated based on a pattern of used detected based on interaction data obtained by one or more sensors in the environment; and adjust operation of one or more functionalities in the one or more devices based on the one or more policies.

BRIEF DESCRIPTION OF THE DRAWINGS

FIG. 2 is an overview of a methodology for inferring and providing one or more social protocols, according to an embodiment of the invention.

FIG. 3 is a flow diagram of a method for detecting behavioral patterns and inferring one or more social protocols regarding use of one or more portable devices in a given environment, according to an embodiment of the invention.

DETAILED DESCRIPTION

Illustrative embodiments of the invention may be described herein in the context of illustrative methods, systems and apparatus for inferring one or more social protocols guiding the use of portable devices. However, it is to be understood that embodiments of the invention are not limited to the illustrative methods, systems and apparatus but instead are more broadly applicable to other suitable methods, systems and apparatus.

The term "social protocol" refers to a set of rules or policies for human interactions which lead to a well-coordinated collaboration among the members of a group in a particular environment. For example, social protocols may refer to a code of behavior that delineates expectations for social behavior according to conventional norms within an environment. Under existing social protocols, a member of an environment may be recommended to adapt his or her behavior a certain way (e.g., lowering voice, not running in hallway, taking off hats, etc.) or be required to follow a set of rules regarding use of portable devices (e.g., turning off cell phones, turning off flash function, etc.).

The term "environment" refers to a physical place where there is human interaction. An environment may comprise, but is not limited to, an outdoor or indoor geographic area, a building or a room within a building, or a public or private setting for any type of gathering.

The term "interaction data" refers to information relating to a user's interaction with an environment and/or one or more portable devices in the environment, and is captured by one or more sensors placed in the environment. Interaction data may comprise, but is not limited to, a picture of a user of a portable device making a call or a video recording of a user of a portable device adjusting one or more functionalities of the portable device.

The term "client application" refers to a piece of software running on a user device interacting with a remote server. A client application may comprise, but is not limited to, an application installed on a user's portable device allowing the user to send and/or receive information from a remotely located server. The client application may be further configured to control operations of one or more other applications or functionalities installed on the user's portable device.

Figure 1A:
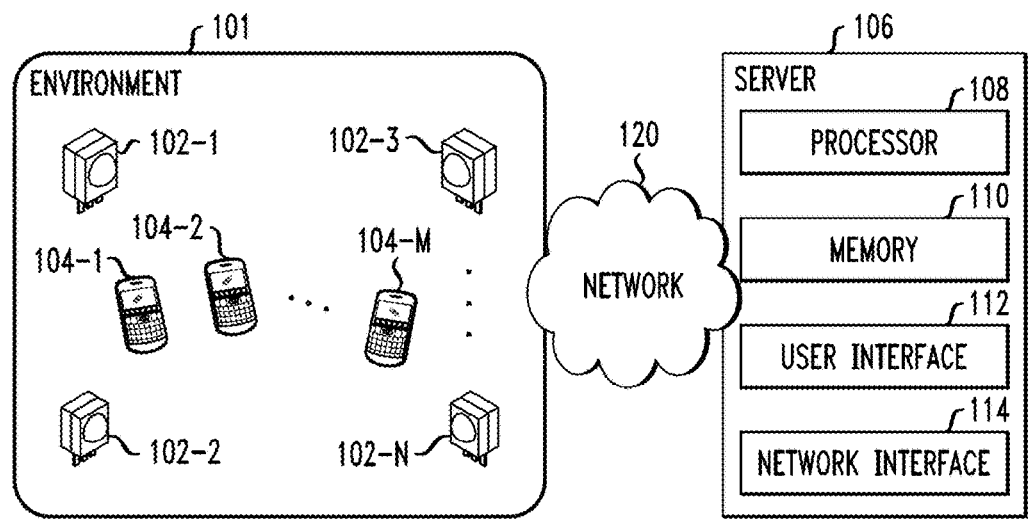
FIG. 1A illustrates a system with one or more portable devices and one or more sensors to obtain interaction data with regard to use of one or more portable devices in an environment, according to an embodiment of the invention.

Referring now to FIG. 1A, a system 100 comprises one or more sensors 102-1, 102-2, 102-3 . . . 102-N (collectively referred to as sensors 102) including, but not limited to, video and/or still cameras, motion sensors, infrared sensors, and acoustic sensors placed in an environment 101. The sensors 102 may be installed as Internet of Things (IoT) elements in the environment. IoT is a term that refers to a network computing environment in which physical items ("things") such as devices, objects, and other things, etc., are equipped with unique identifiers, network connectivity, and other embedded technologies, which allows such devices, objects, and items to sense, communicate, interact, and send/receive data over one or more communications networks (e.g., Internet, etc.) without requiring human-to-human or human-to-computer interaction. In accordance with an embodiment, the sensors 102 may be located and distributed in the environment providing suitable vantage points, including, for example, higher altitude locations such as the ceiling, lamp posts, or on tall buildings.

The system 100 further comprises one or more portable devices 104-1, 104-2 ..., 104-M (collectively referred to as portable devices 104) including, but not limited to, a cell phone, smartphone, tablet, laptop, personal digital assistant (PDA), iPod, iPad, and wearable devices. In accordance with an embodiment, the sensors 102 detect interaction data with regard to use of the one or more of the portable devices 104 in an environment. The interaction data captured by the sensors 102 may comprise, for example, a user putting a smartphone on silent-mode upon entering the environment.

The system 100 further comprises a server 106 which may be located within the environment 101 or in a location remote from the environment 101. The server 106 is operatively coupled to the sensors 102 in the environment via a communications network 120. The server 106 may include, but not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The server 106 may include one or more processors 108 coupled to a memory 110, a user interface 112 and a network interface 114. User interface 112 may be configured to enable user input into the server 106. Network interface 114 may be configured to enable the server 106 to interface with a network and other system components (e.g., such as the sensors 102 and/or the portable devices 104).

The server 106 continuously monitors the environment through the sensors 102 to obtain interaction data regarding use of the portable devices 104 in the environment. The interaction data obtained by the sensors 102 are received by the server 106 for further processing (i.e., generating of one or more policies).

It is to be appreciated that system 100 may include more or less components than shown in FIG. 1A. For example, system 100 may include multiple ones of the server 106 and may also include additional suitable components. Also, environment 101 may be more than one geographic or physical location.

Figure 1B:
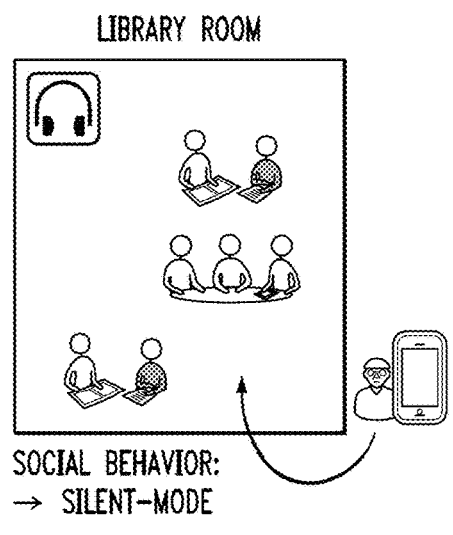
FIG. 1B illustrates an exemplary environment where one or more social protocols with regard to use of one or more portable devices are in effect.

FIG. 1B illustrates an exemplary environment employing the system 100 as described. For example, FIG. 1B shows a library room with a plurality of members present. In this exemplary environment, as will be described in further detail below, one or more sensors have detected and an environment system has inferred, one or more social protocols (e.g., put cellular phones into silent-mode). A new member entering the library room is provided with the one or more social protocols.

Figure 1C:
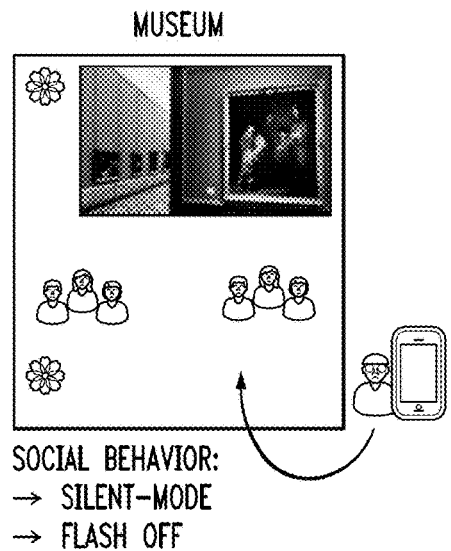
FIG. 1C illustrates another exemplary environment where one or more social protocols with regard to use of one or more portable devices are in effect.

FIG. 1C illustrates another exemplary environment similarly employing the system 100 as described. For example, FIG. 1C shows a museum with a plurality of members present. In this exemplary environment, as will be described in further detail below, one or more sensors have detected and an environment system has inferred, one or more social protocols (e.g., turn off flash). A new member entering the museum is provided with the one or more social protocols.

Referring now to FIG. 2, a flow diagram of a methodology 200 for providing a notification with information on one or more policies in an environment, according to an embodiment of the present invention, is shown. The methodology 200 includes obtaining interaction data (block 210). In accordance with an embodiment, obtaining interaction data can include detecting a user's interaction with one or more portable devices in the environment. The interaction data may comprise, for example, adjustments to one or more functionalities of the one or more portable devices. As will be explained in more detail with respect to FIG. 3, the interaction data may be obtained via one or more sensors in the environment or via one or more internal sensors on the one or more portable devices in the environment.

The methodology 200 further includes detecting patterns (block 220). In accordance with an embodiment, one or more patterns are detected from the obtained interaction data. A pattern can be simply a common behavior by a plurality of members in the environment with respect to the same one or more of the portable devices. For example, when a video sensor captures interaction data such as a plurality of members turning on WiFi on their portable devices upon entering an environment, a pattern is detected.

The methodology 200 further includes generating policies (block 230). In accordance with an embodiment, one or more policies are generated based on the detected patterns. A pattern implies a policy when a number of members following such pattern exceeds a threshold. For example, when an environment system determines that more than half of the members in the environment have turned on WiFi, this pattern implies a policy to turn on WiFi upon entering the environment. Based on the nature of the environment, a policy may be considered by members of the environment as either a recommendation or a requirement.

The methodology 200 further includes providing notifications (block 240). In accordance with an embodiment, one or more notifications comprising information on one or more policies in the environment is provided. As will be explained in more detail with respect to FIG. 4, the one or more notifications comprising information on one or more policies may be provided to a member via a client application installed on the member's portable device or via an audible or visible broadcast in the environment or via notifications sent through a local area network.

Referring now to FIG. 3, a method for detecting and inferring one or more policies for using one or more portable devices in an environment is described in more detail. According to an embodiment, FIG. 3 shows a methodology 300 beginning with a user approaching an environment equipped with sensors (block 310), e.g., such as environment 101 in FIG. 1A. As explained previously, the environment may be equipped with one or more sensors such as, for example, video and/or still cameras, motion sensors, infrared sensors, and acoustic sensors, wherein one or more of the sensors may be IoT elements connected over a communications network. The user may be in possession of one or more portable devices upon entering the environment.

In the next step, a determination is made as to whether the user has a client application installed on the user's portable devices (block 320). When it is determined that the user has not installed the client application on any of the user's portable devices, only publicly observable interaction data are captured by the one or more sensors in the environment (block 330). Publicly observable interaction data may comprise, for example, putting a laptop in a bag upon entering or when a meeting starts. Alternatively, when it is determined that the user has installed the client application on at least one of the user's portable devices, detailed interaction data are captured by one or more internal sensors on the portable devices (block 340). An internal sensor may comprise, for example, an application installed on a user's portable device operative to keep track of any changes to one or more functionalities of the user's portable device (e.g., turning on/off WiFi, turning on/off flash, entering silent mode and/or airplane mode, etc.). Obtaining detailed interaction data may be carried out by, for example, the client application. Detailed interaction data may comprise, for example, information such as the user's smartphone entering silent-mode. In other embodiments, when the user has the client application installed on at least one of the portable devices, detailed interaction data may be captured in addition to publicly observable interaction data.

Finally, the interaction data are sent to an environment system comprising a server (e.g., server 106), which may be locally or remotely located with respect to the environment itself. The environment system continuously monitors the environment for interaction data via the one or more sensors. The environment system receives the interaction data, detects one or more patterns within the interaction data and infers one or more policies based on the one or more patterns (block 350). As explained previously, a common behavior with respect to the same one or more of the portable devices by a plurality of members in the environment is detected as a pattern and when the pattern exceeds a predetermined threshold (e.g., a majority, the most common), one or more policies are generated based on the detected patterns.

Figure 4:
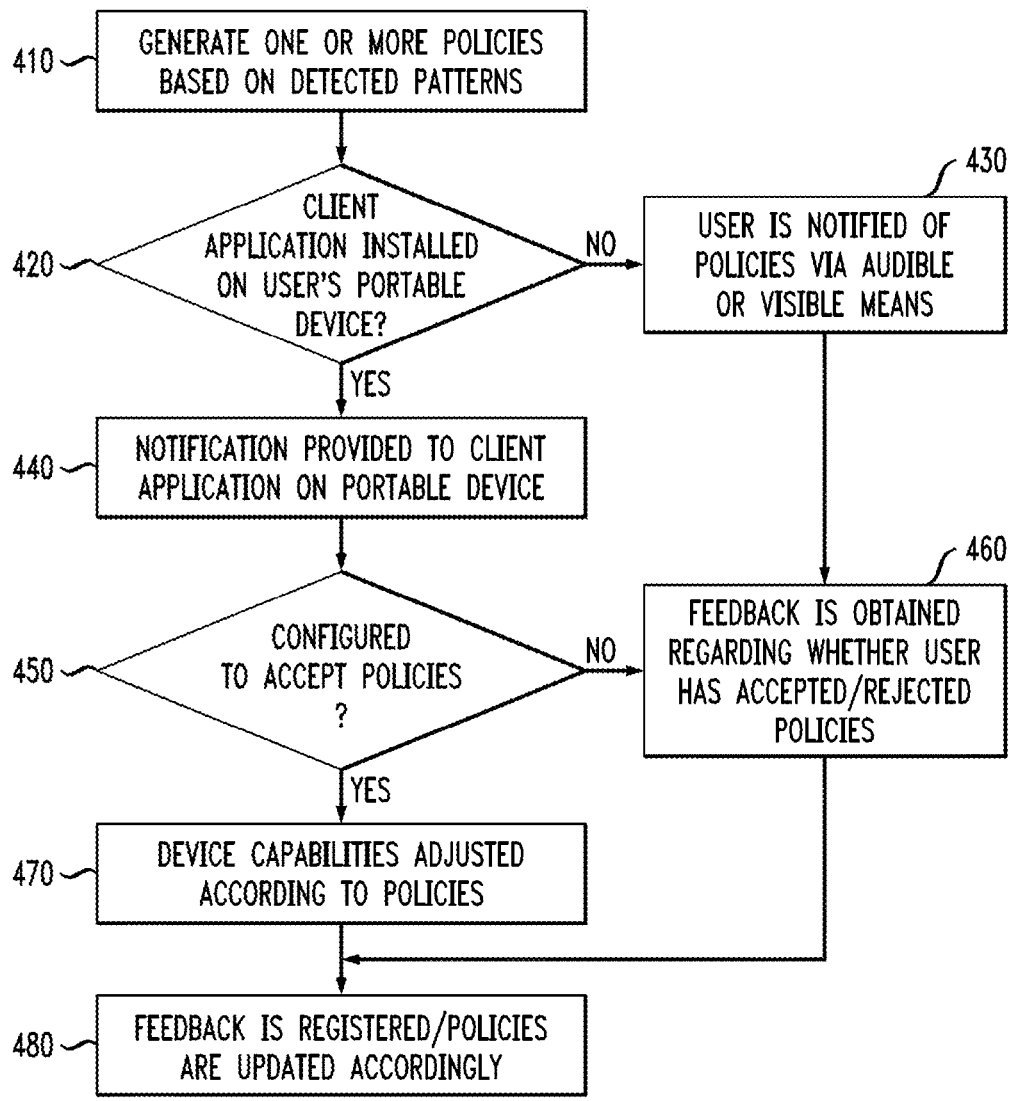
FIG. 4 is a flow diagram of a method for providing one or more social protocols in an environment and evaluating the one or more social protocols based on received feedback, according to an embodiment of the invention.

Referring now to FIG. 4, a method for providing one or more notifications and updating one or more policies in an environment system is described in more detail. According to an embodiment, FIG. 4 shows a methodology 400, beginning with generating one or more policies based on detected patterns (block 410). This step corresponds to block 350 shown in FIG. 3. Steps prior to generating the one or more policies in the methodology 400 correspond to blocks 310-340 shown in FIG. 3 and are omitted in FIG. 4 for the economy of description.

In the next step, a determination is made as to whether the user has the client application installed on at least one of the user's portable devices (block 420). When it is determined that the user has not installed the client application on any of the user's portable devices, the user is notified of the one or more policies via an audible or visible broadcast in the environment (block 430). An audible broadcast may include, for example, an announcement broadcasted in the environment. Alternatively, a visible broadcast may include, for example, a message displayed on an LED screen in the environment visible to the user. In other embodiments, a notification comprising information on the one or more policies may be provided to one or more environment regulators (e.g., a security guard) in the environment. In such embodiments, the user of a portable device may receive an in-person notification from the one or more environment regulators. When it is determined that the user has installed the client application on at least one of the user's portable devices, the environment system directly provides the notification to the client application (block 440). The notification may be provided in the form of, for example, a pop-up window, a text message or a phone call. The notification can come from the server 106 and/or one or more of the sensors 102.

In the next step, a determination is made as to whether the user's portable device with the client application installed has been previously configured to automatically accept the one or more policies (block 450). When it is determined that the user's portable device has not been configured to automatically accept the policies sent by the environment system, the user has a choice to accept the policies. In response to the user's choice, the environment system obtains feedback regarding the generated policies (block 460). For example, when the user is provided with a notification comprising information on the one or more policies with regard to a portable device (e.g., to put any of the portable devices into airplane-mode), the environment system detects whether the user has complied with the policies. When the user has installed the client application on at least one of the portable devices, obtaining feedback may comprise utilizing the one or more internal sensors in the portable device to detect functional adjustment in compliance with the policies. When the user has not installed the client application on any of the portable devices, obtaining feedback may comprise utilizing the one or more sensors in the environment to detect whether the user has taken necessary actions. When the user has configured the portable device to automatically accept policies, respective device capabilities are adjusted automatically in compliance with the policies (block 470).

Finally, the environment system receives the obtained feedback (block 480). The environment system validates one or more of the generated policies based on the information contained in the feedback. For example, when it is determined from the feedback that more than a majority of the members in the environment, when provided with a policy, chose to ignore the policy, the policy is deleted. In alternative embodiments, the environment system may utilize the feedback to generate a rank for the generated policies. For example, when a low number of members in the environment chose to accept a policy, the policy may be classified as a mere recommendation. Alternatively, when a high number of members in the environment chose to accept a policy, the policy may be classified as a requirement rather than a recommendation.

Figure 5:
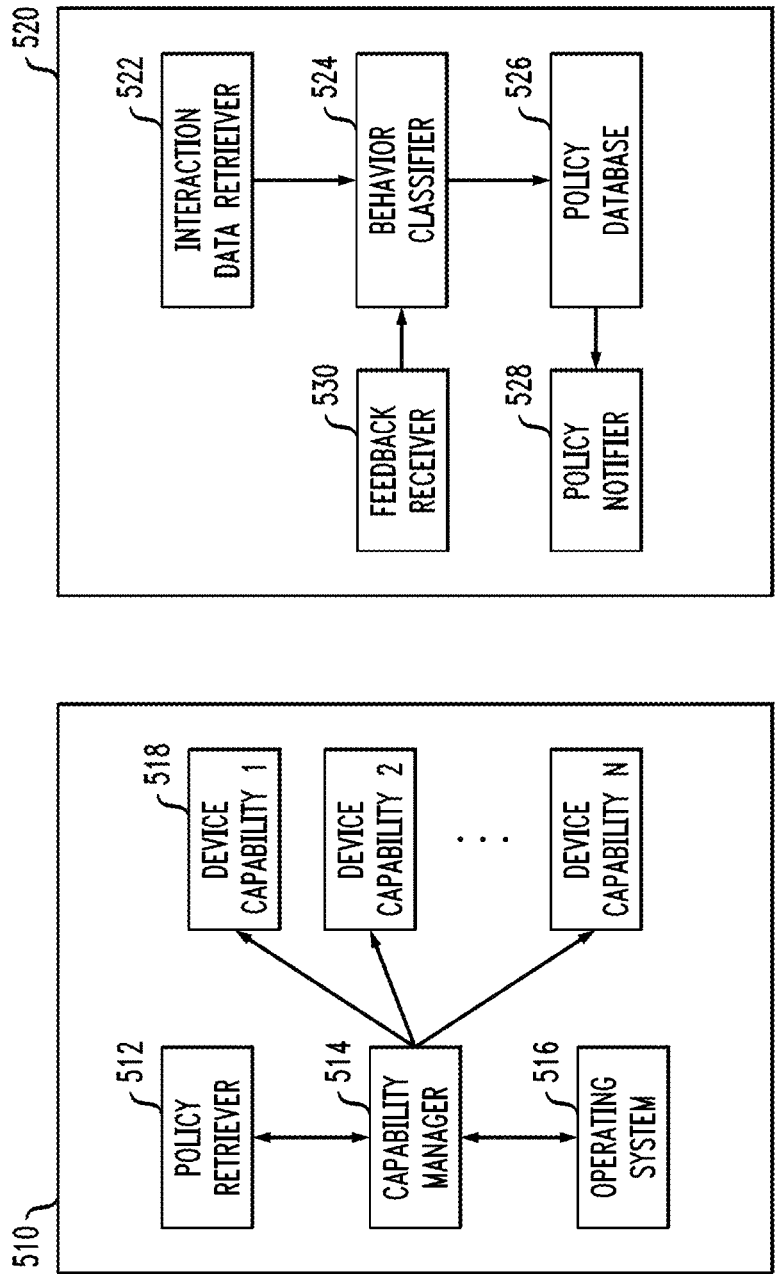
FIG. 5 illustrates interaction between a user device and an environment system, according to an embodiment of the invention.

Referring now to FIG. 5, an interaction between a user device and an environment system server is illustrated. FIG. 5 shows a system 500 comprising a user device 510 and an environment system server 520. The user device 510 comprises a policy retriever module 512 and a capability manager module 514 operatively coupled to an operating system 516. According to an embodiment, the policy retriever module 512 and the capability manager module 514 may together form what is previously described as a client application. In alternative embodiments, the policy retriever module 512 and the capability manager module 514 may be operated by a client application separately installed on the device 510.

The user device 510 further comprises one or more device capabilities 518. For example, the user device 510 may be capable of making a call (Device Capability 1), taking picture (Device Capability 2) and surfing the Internet (Device Capability N). For example, when the policy retriever module 512 receives a notification of a policy comprising information that no calls should be made while in a particular environment (e.g., block 440, FIG. 4), the capability manager 514 may disable calling functionality (Device Capability 1) by switching the device to airplane-mode (e.g., block 470, FIG. 4). Alternatively, when the policy retriever module 512 receives a notification comprising information that flash cannot be used while taking a picture in the environment, the capability manager 514 may adjust camera functionality (Device Capability 2) by turning off the flash in the user device 510.

The environment system server 520 comprises an interaction data retriever module 522, a behavior classifier module 524, a policy database 526, a policy notifier module 528 and a feedback receiver module 530. According to an embodiment, the interaction data retriever module 522 is operatively coupled to one or more sensors in an environment over a communications network. The interaction data retriever module 522 is configured to receive interaction data and feed the data to the behavior classifier module 524. The behavior classifier module 524 detects one or more patterns of use of one or more devices in the environment from the received interaction data (e.g., block 350, FIG. 3). Once one or more patterns are detected, the behavior classifier module 524 generates a policy based on the detected pattern when the pattern occurs more than a pre-determined amount of times. The one or more policies generated are stored in the policy database 526. According to an embodiment, when a new user enters the environment with one or more portable devices for which one or more policies have been generated, the policy notifier module 528 pulls the corresponding policy from the policy database 526 and provides a notification comprising information with regard to the policy to a policy retriever module 512 on a user device 510. Note that the term new user also refers to returning users, so that the notifications also represent a way to reinforce/remind one or more social protocols in a certain environment.

The environment system is capable of obtaining feedback data regarding the acceptance or rejection of the generated policies. As described previously, feedback is obtained via the one or more sensors in the environment or via the one or more internal sensors on the one or more portable devices. Once feedback data is obtained, it is sent to a feedback receiver module 530. The feedback receiver module 530 sends the received feedback to the behavior classifier module 524 where the feedback is analyzed. As described previously, for example, when it is determined from the feedback that more than a majority of the members in the environment chose to ignore the provided policy, the policy is deleted from the policy database 526.

Embodiments of the invention may be a system, a method, and/or a computer program product at any possible technical detail level of integration. The computer program product may include a computer readable storage medium (or media) having computer readable program instructions thereon for causing a processor (e.g., processor 108) to carry out aspects of the present invention. For example, computer system/server 106 may comprise a computer program product for implementing embodiments of the invention disclosed herein.

The computer readable storage medium (e.g., memory 110) can be a tangible device that can retain and store instructions of use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface (e.g., network interface 114) in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 120), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
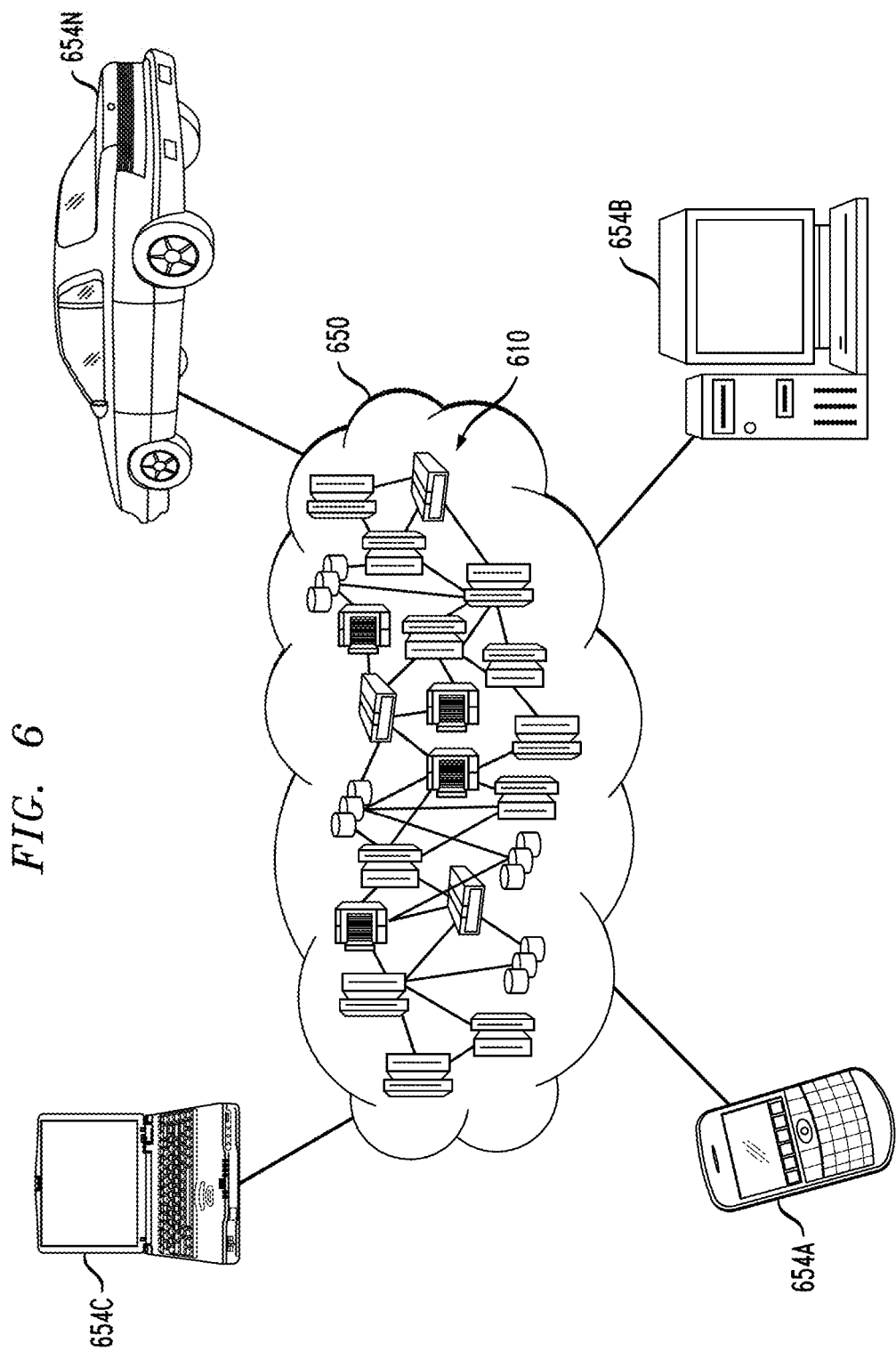
FIG. 6 illustrates a cloud computing environment, according to an embodiment of the invention.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
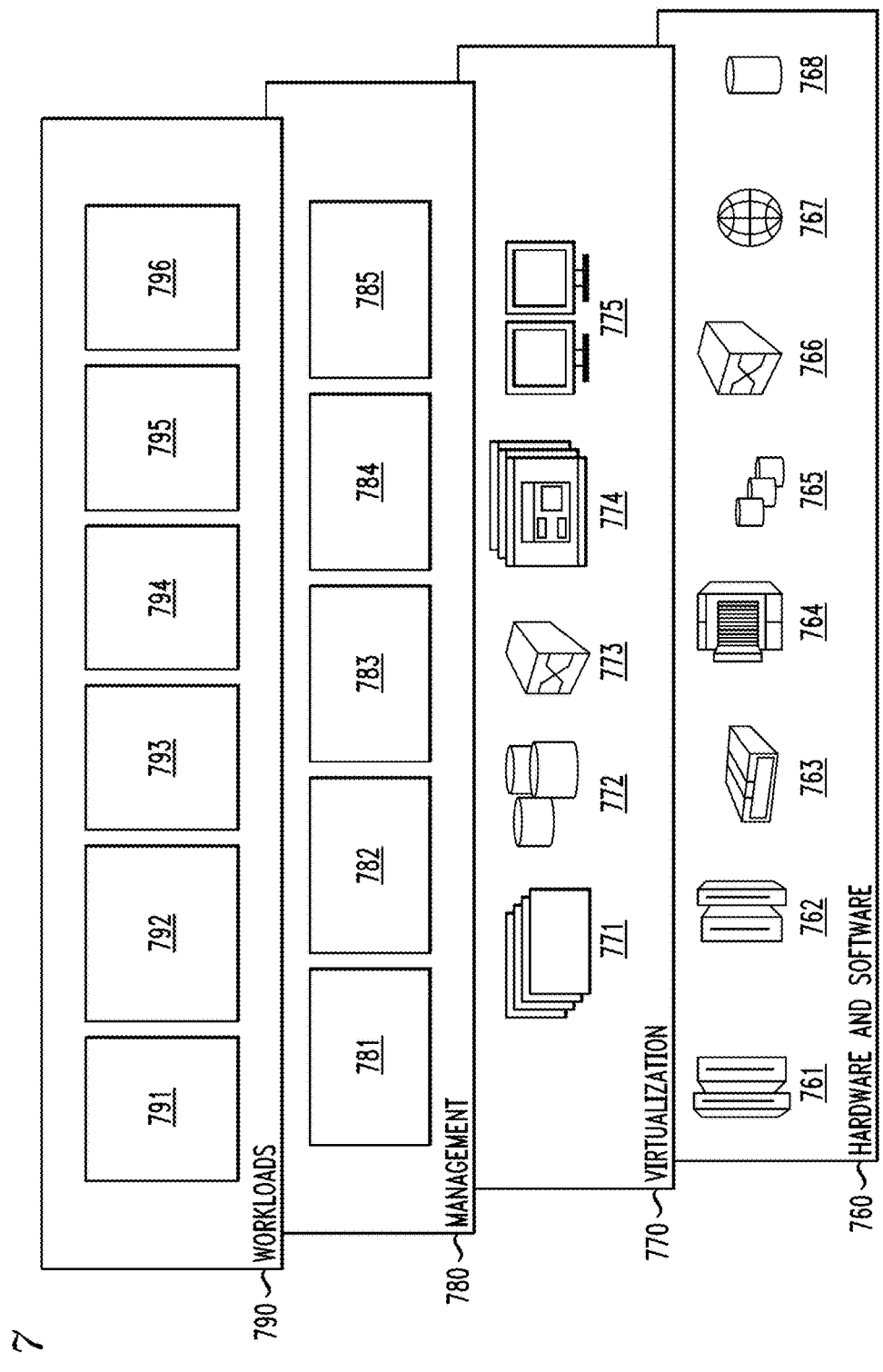
FIG. 7 depicts abstraction model layers according to an embodiment of the invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provides pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and object detection and tracking 796, which may implement the functionality described above with respect to FIGS. 1-6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving a notification by at least one of a new user and a returning user comprising one or more policies of use of one or more devices in an environment, wherein the one or more policies are generated based on a pattern of use detected based on interaction data obtained by one or more sensors in the environment, and the one or more policies comprise at least one social protocol defining at least one rule associated with the group for interaction with the one or more devices and the environment;
    adjusting operation of one or more functionalities in the one or more devices based on the one or more policies;
    setting a threshold for a number of devices in the environment; and
    detecting a pattern when a number of devices being used in a particular manner exceeds the threshold.

2. The method of claim 1, wherein the interaction data comprises information regarding a change in use of the one or more devices upon entering the environment.

3. The method of claim 1, wherein the one or more sensors comprise at least one of:
    an external sensor in the environment; and
    an internal sensor operating on the one or more devices;
    wherein the external sensor captures interaction data comprising publicly observable use of the one or more devices and the internal sensor captures interaction data comprising a change in one or more functionalities of the one or more devices.

4. The method of claim 1, wherein the notification is received via at least one of an audible and visible broadcast in the environment.

5. The method of claim 4, further comprising installing an application on the one or more devices, wherein the application is configured to receive the notification.

6. The method off claim 5, wherein the application is configured to automatically adjust the operation of the one or more functionalities pursuant to the one or more policies.

7. The method of claim 1, wherein the notification is provided to the one or more devices in the environment.

8. The method of claim 1, further comprising sending feedback as to whether the one or more policies in the notification provided to the one or more devices are accepted or rejected, wherein the feedback is utilized to adjust the detected pattern.

9. The method of claim 8, further comprising installing an application on the one or more devices, wherein the application is configured to send the feedback.

10. The method of claim 8, wherein the feedback is obtained by the one or more sensors in the environment.

11. An article of manufacture comprising a computer readable storage medium for storing computer readable program code which, when executed, causes a computer to perform the steps according to claim 1.

12. An apparatus, comprising:
a memory; and
a processor operatively coupled to the memory and configured to:
receive a notification by at least one of a new user and a returning user comprising one or more policies of use of one or more devices in an environment, wherein the one or more policies are generated based on a pattern of use detected based on interaction data obtained by one or more sensors in the environment, and the one or more policies comprise at least one social protocol defining at least one rule associated with the group for interaction with the one or more devices and the environment
adjust operation of one or more functionalities in the one or more devices based on the one or more policies;
set a threshold for a number of devices in the environment; and
detect a pattern when a number of devices being used in a particular manner exceeds the threshold.

13. The apparatus of claim 12, wherein the interaction data comprises information regarding a change in use of the one or more devices upon entering the environment.

14. The apparatus of claim 12, wherein the one or more sensors comprise at least one of:
an external sensor in the environment; and
an internal sensor operating on the one or more devices;
wherein the external sensor captures interaction data comprising publicly observable use of the one or more devices and the internal sensor captures interaction data comprising a change in one or more functionalities of the one or more devices.

15. The apparatus of claim 12, wherein the notification is received by an application installed on the one or more devices in the environment, and wherein the application is configured to automatically adjust the one or more functionalities of the one or more devices pursuant to the one or more policies in the notification.

16. The apparatus of claim 12, wherein the processor is further configured to send feedback as to whether the one or more policies in the notification provided to the one or more devices are accepted or rejected, wherein the feedback is utilized to adjust the detected pattern.

17. The apparatus of claim 16, wherein the feedback is sent by an application installed on the one or more devices in the environment, and wherein the feedback is obtained by the one or more sensors in the environment.

18. A method comprising:
receiving a notification comprising one or more policies of use of one or more devices in an environment, wherein the one or more policies are generated based on a pattern of use detected based on interaction data obtained by one or more sensors in the environment, and the one or more policies comprise at least one social protocol defining at least one rule associated with the group for interaction with the one or more devices and the environment;
adjusting operation of one or more functionalities in the one or more devices based on the one or more policies;
setting a threshold for a number of devices in the environment; and
detecting a pattern when a number of devices being used in a particular manner exceeds the threshold.

* * * * *